United States Patent [19]

Tsuji

[11] Patent Number: 4,854,679
[45] Date of Patent: Aug. 8, 1989

[54] PHOTOGRAPHIC SYSTEM HAVING FRONT CONVERSION LENS

[75] Inventor: Sadahiko Tsuji, Kanagawa, Japan
[73] Assignee: Canon Kabushiki Kaisha, Tokyo, Japan
[21] Appl. No.: 122,217
[22] Filed: Nov. 18, 1987

[30] Foreign Application Priority Data

| Nov. 20, 1986 | [JP] | Japan | 61-179613 |
| Nov. 20, 1986 | [JP] | Japan | 61-179614 |
| Nov. 20, 1986 | [JP] | Japan | 61-179615 |
| Nov. 20, 1986 | [JP] | Japan | 61-179616 |

[51] Int. Cl.$^4$ .............................................. G02B 15/06
[52] U.S. Cl. .................................................... 350/422
[58] Field of Search ........................................ 350/422

[56] References Cited

U.S. PATENT DOCUMENTS

| 1,169,731 | 1/1916 | Mengel | 350/422 |
| 2,829,559 | 4/1958 | Lautenbacher | 350/422 |

Primary Examiner—Bruce Y. Arnold
Assistant Examiner—Rebecca D. Gass
Attorney, Agent, or Firm—Fitzpatrick, Cella, Harper & Scinto

[57] ABSTRACT

To minimize the size of a front conversion lens, an aperture stop is arranged on the object side of a master lens, and the front conversion lens is made releasably attachable.

10 Claims, 4 Drawing Sheets

FIG.3
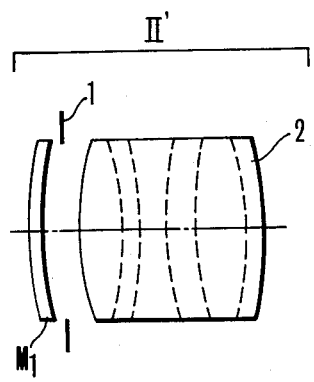
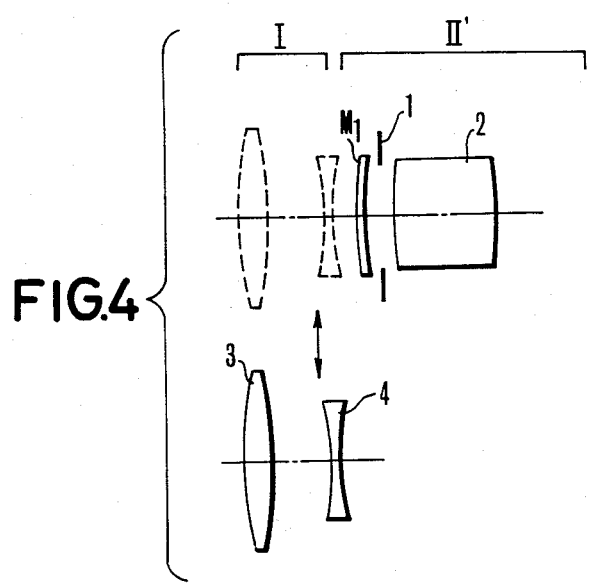
FIG.4

PHOTOGRAPHIC SYSTEM HAVING FRONT CONVERSION LENS

BACKGROUND OF THE INVENTION

1. Field of the Invention

This invention relates to conversion lenses capable of changing the focal length of a master lens.

2. Description of the Related Art

The conventional simple methods of changing the focal length of a photographic system are to bring and take a negative lens unit into or out of axial alignment on the image side of a master lens having an aperture stop incorporated therein, or the so-called rear conversion method, and to releasably attach an afocal conversion lens to the object side of a master lens, or the so-called front conversion method. The photographic system employing the former method changes its F-number as the focal length changes. Another drawback is that the decentering tolerances should be very tight.

In the latter method, on the other hand, though the decentering tolerances may be set relatively loose, and the F-number can be maintained constant against change of the focal length, because the distance from the aperture stop in the master lens to the conversion lens, the conversion lens tends to become bulky and heavy. Such a front conversion lens is very difficult to build in the interior of the camera body. It has, therefore, been the common practice in the prior art to provide for the front conversion lens in the form of a separate accessory item.

SUMMARY OF THE INVENTION

A first object of the invention is to provide a front conversion lens of reduced size while still permitting the F-number of the photographic system employing the same to remain unchanged.

To achieve this, the invention has a feature that an aperture stop for determining the F-number is positioned on the object side of a master lens, and the front conversion lens is made releasably attachable in front of this aperture top.

In this connection it should be pointed out that when the front conversion lens is out of axial alignment, the aperture stop and a drive mechanism therefor are exposed to the outer atmosphere, thus suffering contamination with dust or the like and becoming liable to damage.

A second object of the invention is, therefore, to provide a photographic lens having its aperture stop freed from the contamination and damage even when the front conversion lens based on the first object is not attached.

A third object is to provide a photographic system having a conversion lens built in the housing thereof and arranged to change the focal length of the entire system easily and quickly.

BRIEF DESCRIPTION OF THE DRAWINGS

FIG. 3 is a schematic diagram illustrating a third embodiment according t the invention.

FIG. 4 is a schematic diagram illustrating a fourth embodiment according to the invention.

DETAILED DESCRIPTION OF THE PREFERRED EMBODIMENTS

Figure 1:
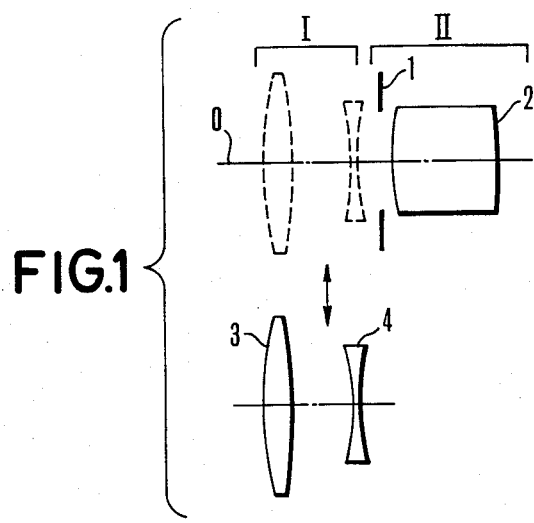
FIG. 1 is a schematic diagram illustrating a first embodiment according to the invention.

FIG. 1 is a longitudinal section view of a first embodiment of an optical system according to the invention. II is a master lens unit including a master lens 2 and an aperture stop 1 positioned in front of the master lens 2 to determine a full open F-number. The master lens 2 is assumed to comprise a plurality of lens elements.

I is a conversion lens for releasable attachment on the object side of the aperture stop 1 as shown by a double-headed arrow to change the focal length of the entire system.

In this embodiment shown in FIG. 1, the conversion lens I comprises, from front to rear, a first lens unit 3 having a positive refractive power and a second lens unit 4 having a negative refractive power and is designed as a whole so as to form an afocal system. Hence it is a tele-conversion lens. These units each are constructed with one lens or a plurality of lenses.

When to change the focal length, the tele-conversion lens I though put on the object side of the aperture stop 1 takes its place adjacent it. To admit of the most outer oblique beam, therefore, the diameter of the first lens unit 3 may be shortened. This makes it possible to construct the tele-conversion lens in a more compact form than was heretofore possible. Also, the F-number is maintained constant against change of the focal length. Moreover, since the lens units 3 and 4 move in unison, the spacing and decentering tolerances can be set loose.

Figure 2:
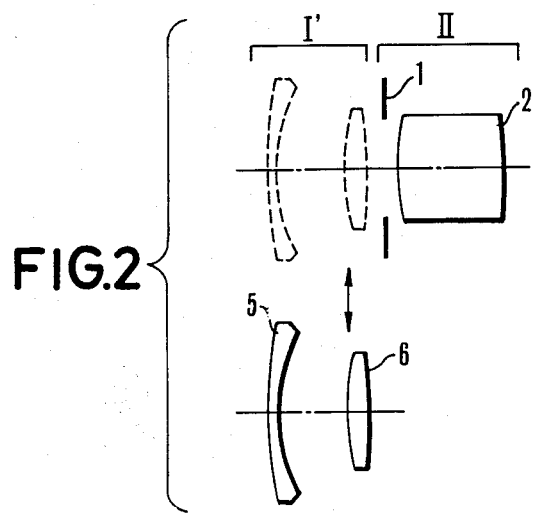
FIG. 2 is a schematic diagram illustrating a second embodiment according to the invention.

In a second embodiment of FIG. 2, the front conversion lens is constructed in the form of a so-called wide conversion lens I' comprising, from front to rear, a first unit 5 having a negative refractive power and a second unit 6 having a positive refractive power. By entering it just in front of the aperture stop 1, the focal length of the entire system is changed to a shorter value.

By the way, in the foregoing embodiments, with the front conversion lens I or I' when detached from the master lens unit II, the aperture stop 1 is exposed to the outer atmosphere. As dust invades, therefore, the performance of the aperture stop 1 and the mechanism for operating the aperture stop 1 will be lowered objectionably at a high possibility. On this account, the invention has another feature that, in order to prevent the aperture stop 1 from being contaminated to D a damage when the conversion lens I or I' is not attached, use is made, on the object side of the aperture stop 1, of a meniscus-shaped lens of forward convexity which also serves as a protection glass. Thus, the optical performance of the master lens 2 or the entire system is preserved at an excellent grade. How to realize this feature is described below.

FIG. 3 is a longitudinal section view of a master lens unit II' illustrating a third embodiment of the invention. This unit comprises, from front to rear, a meniscus lens $M_1$ convex toward the front, the aperture stop 1 and the master lens 2. By such an arrangement, the meniscus lens $M_1$ protects the aperture stop 1 from the outer atmosphere, and, at the same time, because its turning the convex curvature toward the front, gets a concentric tendency to the aperture stop 1. This is advantageous at correcting aberrations, particularly angular field characteristics.

Here, a rule of design: $|f_1| > 10f$ is set forth where $f_1$ is the focal length of the meniscus lens $M_1$ and f is the focal length of the entire system. When this rule is satisfied, the optical system is prevented from becoming extremely asymmetry with an advantage of facilitating good correction of aberrations of the entire system. In the case of the photographic system which has no large limitation on the back focal distance, if $f_1 > 0$ is chosen, it will become possible to reduce the spherical aberration of the entire system and to increase the relative aperture. In the case when the back focal distance is required to increase, or the image surface is required to be flattened at a large angle of field, on the other hand, if $f_1 < 0$ is chosen, the so-called retrofocus type is formed, thereby it being made possible to reduce the Petzval sum and to increase the back focal distance.

FIG. 4 shows a fourth embodiment of the invention wherein the master lens unit II' comprises, from front to rear, the meniscus lens $M_1$, the aperture stop 1, and the master lens 2 for forming an image, and a tele-conversion lens I is arranged on the object side of the meniscus lens $M_1$ to enter into and retract from the axial alignment with the master lens unit II'. The tele-conversion lens I is constructed as shown by the solid line curves in FIG. 4 from a first lens unit 3 having a positive refractive power and a second lens unit 4 having a negative refractive power, both forming an afocal system.

When to change the focal length, the tele-conversion lens I is put into and taken from the object side of the meniscus lens $M_1$ as shown by the arrow. Even in the state that this tele-conversion lens I is absent, the aperture stop 1 is protected by the meniscus lens $M_1$ so that there is no possibility of damaging it by the force from the outside.

Figure 5:
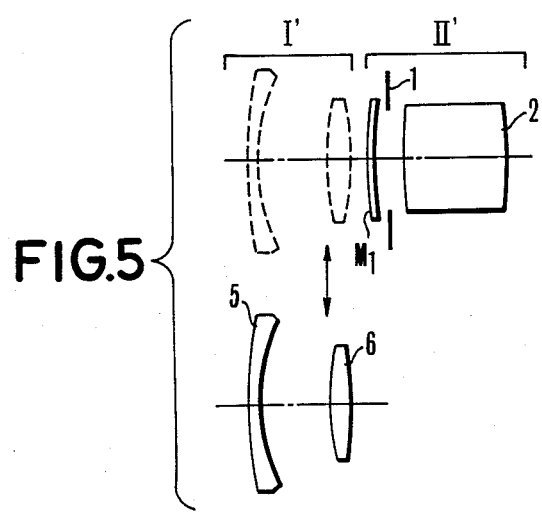
FIG. 5 is a schematic diagram illustrating a fifth embodiment according to the invention.

FIG. 5 shows a fifth embodiment of the invention wherein the wide conversion lens I' of FIG. 2 is used in combination with the master lens unit II' of FIG. 4.

Figure 6:
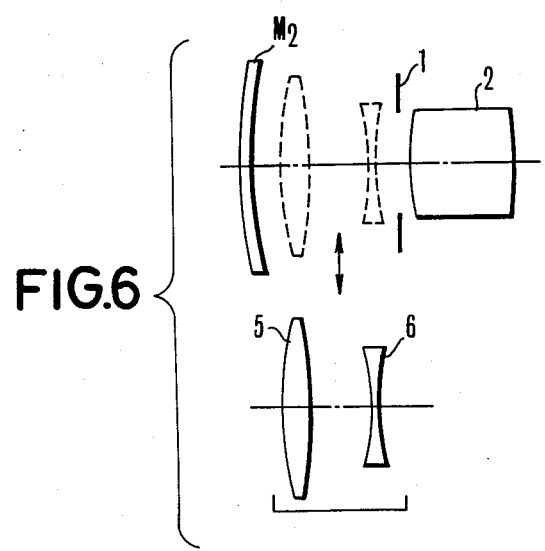
FIG. 6 is a schematic diagram illustrating a sixth embodiment according to the invention.
Figure 7:
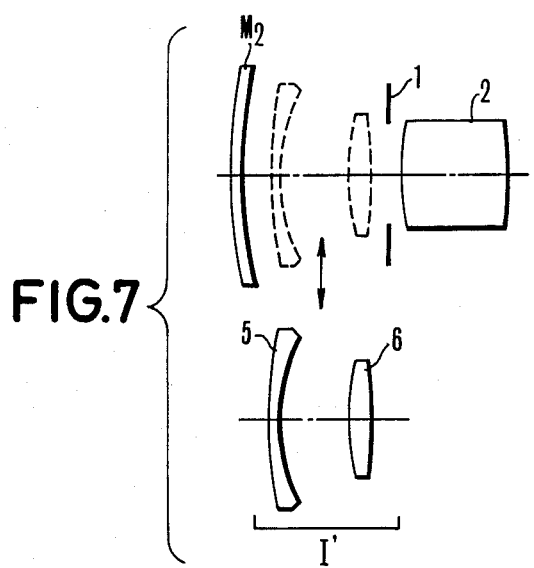
FIG. 7 is a schematic diagram illustrating a seventh embodiment according to the invention.

Next, by reference to FIGS. 6 and 7, still other embodiments are described. In these embodiments, a meniscus lens M2 satisfying the above-described inequality of condition is arranged in the frontmost position to create a space between it and the aperture stop 1 which the conversion lens I or I' releasably occupies.

In the example of FIG. 6, the conversion lens I comprises, from front to rear, a positive lens unit 3 and a negative lens unit 4, thus taking the form of the telephoto type conversion lens.

In the example of FIG. 7, it comprises, from front to rear, a negative lens unit 5 and a positive lens unit 6, thus taking the form of the wide angle type conversion lens.

Figure 8:
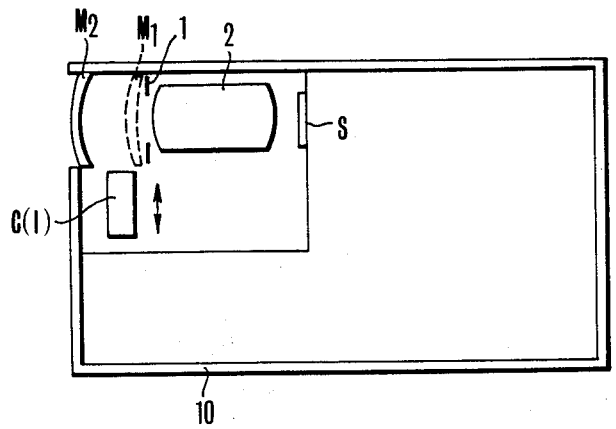
FIG. 8 is a schematic diagram illustrating the application of a front conversion lens according to the invention to a video camera.

Referring next to FIG. 8, there is shown an example of application of the photographic optical system of the invention to a portable video camera.

1 is an aperture stop arranged in front of a master lens 2, M2 is a meniscus lens convex toward the front, C(I) is a front conversion lens which can take either of the lens forms of the wide and tele types as described above.

For note, it is not always required that the meniscus lens M2 must take the frontmost position of the photographic lens. It may take the position of the meniscus lens $M_1$ shown by dashed line curves, as has been mentioned before. S is an image pickup device such as CCD. 10 is a housing in which all the lens system described above is built and housed. This housing 10 holds the meniscus lens M2 in an opening thereof with an air-tight seal preventing dust or foreign particles from entering the interior of the housing 10 from the outside thereof.

What is claimed is:

1. A photographic lens system comprising:
a master lens unit comprising a plurality of lenses and having a positive refractive power and a predetermined image forming plane;
an aperture stop positioned on the object side of said master lens unit to determine an F-number; a conversion lens unit attachable and
detachable in front of said aperture stop for changing the focal length without changing the position of said predetermined image forming plane of said master lens unit.

2. A photographic lens system according to claim 1, further comprising one meniscus lens of forward convexity positioned on the object side of said aperture stop.

3. A photographic lens system according to claim 2, satisfying the following condition:

$$|f_1| > 10 f_T$$

where $f_1$ is the focal length of said meniscus lens, and $f_T$ is the focal length of the entire lens system.

4. A photographic lens system according to claim 2, wherein said meniscus lens is positioned in between said aperture stop and said conversion lens unit.

5. A photographic lens system according to claim 2, wherein said meniscus lens is positioned in a front-most position.

6. A camera comprising:
a master lens unit comprising a plurality of lenses having a positive refractive power and a predetermined image forming plane;
an aperture stop positioned on the object side of said master lens unit to determine an F-number;
a conversion lens unit attachable and detachable in front of said aperture stop for changing the focal length without changing the position of said predetermined image forming plane of said master lens unit; and
housing means for housing said master lens unit, said aperture stop and said conversion lens unit.

7. A camera according to claim 6, further comprising one meniscus lens of forward convexity positioned on the object side of said aperture stop.

8. A camera according to claim 7, satisfying the following condition:

$$|f_1| > 10 F_T$$

where $f_1$ is the focal length of said meniscus lens, and $f_T$ is the focal length of the entire lens system.

9. A camera according to claim 7, wherein said meniscus lens is positioned in between said aperture stop and said conversion lens unit.

10. A camera according to claim 7, wherein said meniscus lens is positioned in a front-most position.

* * * * *

UNITED STATES PATENT AND TRADEMARK OFFICE
CERTIFICATE OF CORRECTION

PATENT NO. : 4,854,679

DATED : August 8, 1989

INVENTOR(S) : Sadahiko Tsuji

It is certified that error appears in the above-identified patent and that said Letters Patent is hereby corrected as shown below:

At column 1, line 24, "because" should read --because of--;

At column 1, line 43, "aperture top" should read --aperture stop--; and

At column 1, line 66, "t" should read --to--.

At column 2, line 55, "D" should be deleted.

At column 3, line 1, "its turning" should read --it is shaped--;

At column 3, line 2, "the convex curvature" should read --convex--;

At column 3, line 2, "gets" should read --it achieves--;

At column 3, line 3, "to" should read --from--;

UNITED STATES PATENT AND TRADEMARK OFFICE
CERTIFICATE OF CORRECTION

PATENT NO. : 4,854,679

DATED : August 8, 1989

INVENTOR(S) : Sadahiko Tsuji

It is certified that error appears in the above-identified patent and that said Letters Patent is hereby corrected as shown below:

At column 3, line 10, "asymmetry" should read --asymmetric--; and

At column 3, line 45, "lens M2" should read --lens $M_2$--.

At column 4, line 5, "lens M2" should read --lens $M_2$--; and

At column 4, line 5, "air-tight" should read --airtight--.

At claim 1, line 14, "F-number; a con-" should read --F-number;

a con- --.

At claim 5, line 35, "front-most" should read --frontmost--.

At claim 8, line 56, "$|f_1|>10F_T$" should read --$|f_1|>10f_T$--.

At claim 9, line 64, "front-most" should read --frontmost--.

Signed and Sealed this

Twentieth Day of February, 1990

*Attest:*

JEFFREY M. SAMUELS

*Attesting Officer*  *Acting Commissioner of Patents and Trademarks*